J. WHAIT & WILLIAM WHAIT. 2 Sheets—Sheet 1.
Improvement in Combined Cultivator, Seeder, and Stalk Cutter.

No. 123,959. Patented Feb. 20, 1872.

Witnesses
Inventor's

2 Sheets--Sheet 2.

J. WHAIT & WILLIAM WHAIT.
Improvement in Combined Cultivator, Seeder, and Stalk Cutter.

No. 123,959. Patented Feb. 20, 1872.

Witnesses
Jno A Ellis
J F White

Inventor
Jas Whait & Wm Whait
Per
T H Alexander
Atty

UNITED STATES PATENT OFFICE.

JAMES WHAIT AND WILLIAM WHAIT, OF INDEPENDENCE, IOWA.

IMPROVEMENT IN COMBINED CULTIVATORS, SEEDERS, AND STALK-CUTTERS.

Specification forming part of Letters Patent No. 123,959, dated February 20, 1872.

*To all whom it may concern:*

Be it known that we, JAMES WHAIT and WILLIAM WHAIT, of Independence, in the county of Buchanan and State of Iowa, have invented certain new and useful Improvements in Combined Cultivator, Seeder, and Stalk-Cutter; and we do hereby declare that the following is a full, clear, and exact description thereof, reference being had to the accompanying drawings and to the letters of reference marked thereon, which form a part of this specification.

The nature of our invention consists in the construction and arrangement of a "combined seed-sower, cultivator, and stalk-cutter," as will be hereinafter more fully set forth.

In order to enable others skilled in the art to which our invention appertains to make and use the same, we will now proceed to describe its construction and operation, referring to the annexed drawings, in which—

Figure 1:
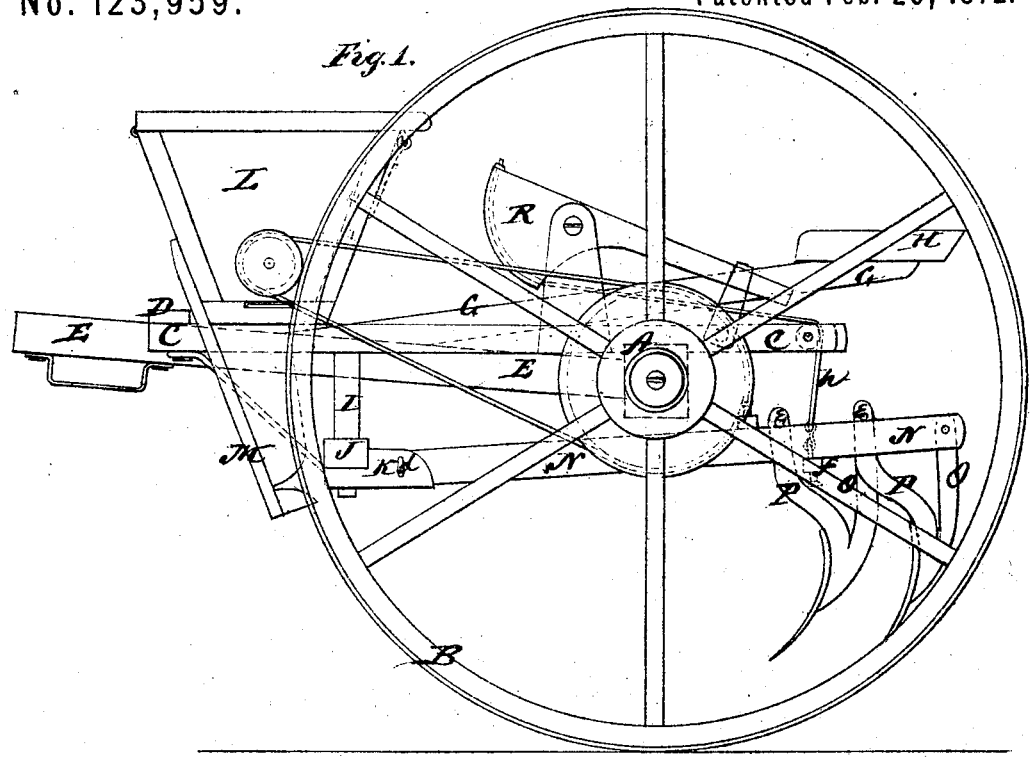
Figure 2:
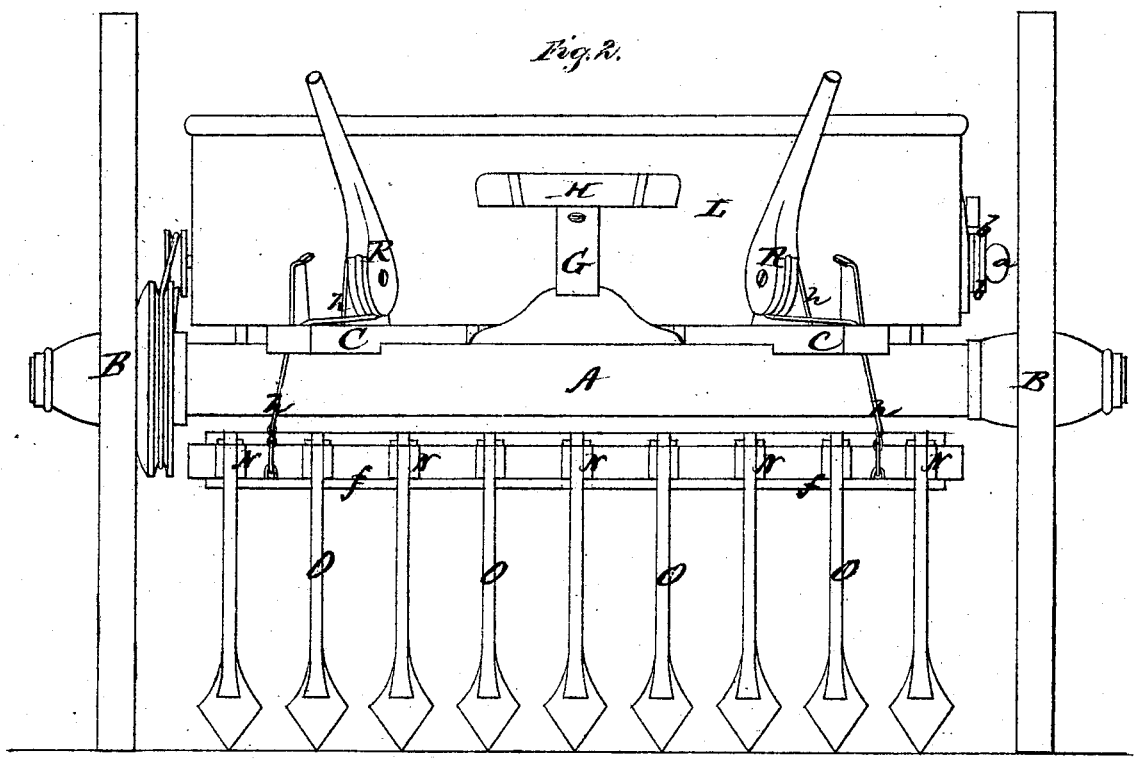
Figure 3:
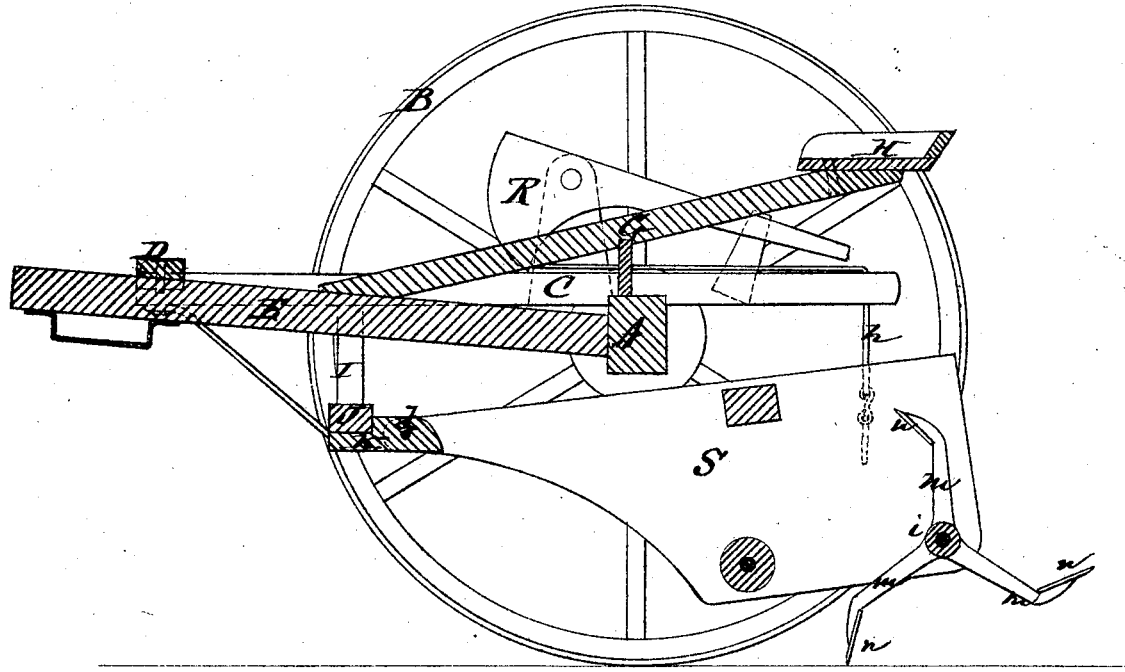

Figure 1 is a side view, and Fig. 2 a rear elevation of our machine as a seed-sower and cultivator; and Fig. 3 is a vertical cross-section of the machine as a stalk-cutter.

A represents the axle, at each end of which is a wheel, B. At suitable points on the axle A are secured two beams, C C, connected at their front ends by a cross-beam, D, and having the tongue E passing between them. On the tongue E is secured a bar, G, which passes toward the rear and supports the driver's seat H. At suitable points on the under side of the side beams C C are two posts, I I, which support a bar, J, having blocks K at suitable intervals on its under side.

The above constitutes the frame of our machine, which is not altered in any form, whether it be used for a cultivator and seed-sower or a stalk-cutter.

At the front ends of the side beams C C, on top of the cross-bar D, is secured the seed-box L by means of two screws passing upward through said bar into the bottom of the box. This seed-box is provided with an agitator-shaft and agitators of any suitable construction, operated by means of a cord, chain, or belt passing around a pulley on said shaft and around a pulley on one of the wheels B. In the bottom of the box L is a slide, operated upon by the set-screw *a* at the end of the box to vary the amount of grain to be sowed by the number of washers *b* placed on said screw. By taking off or putting on said washers, the holes in the bottom of the box are varied, thereby sowing any desired amount, and furnishing one of the most accurate gauges ever used. From the bottom of the seed-box L, under each aperture, is a spout, M, to carry the grain close to the ground before spreading it, said spout being so constructed as to spread the grain just above the ground, and open at the back, so that the driver can see at any time whether the machine is sowing or not, so that the grain does not come up in streaks. Between the blocks K K, on the under side of the bar J, are inserted the front ends of the bars N N, which are all pivoted by one rod, *d*. The rear ends of these bars are forked, and in each one of them is pivoted a plow-shank, O, provided on its front side with a crooked brace, P, which passes up through a mortise in the bar N, and is held on top of the same by means of a wooden pin, *e*. This pin will break in case the plow or tooth strikes anything solid, thereby preventing the breaking of the plow, plow-shank, or any other part of the machine. All the bars N are supported on one bar or rod, *f*, hooked to chains or ropes *h h*, to be operated by cam-levers R R, for the purpose of raising or lowering the plows, as fully described in a patent already granted to us.

When it is desired to use the machine as a stalk-cutter, the seed-box L is removed by unscrewing the screws which secure it in place; and the bars N are also removed by pulling out the rod *d* and unhooking the ropes *h h*. In their place is affixed a frame or shoe, S, so constructed that two arms therefrom will be inserted between the blocks K, and secured by putting the rod *d* in place again, and the body of the frame or shoe suspended by hooking to the ropes *h h*. In the rear portion of the frame S is a shaft or cylinder, *i*, provided with arms *m m* of the peculiar shape shown in Fig. 3, to which arms the knives *n n* are attached. The ends of the arms *m m* where the knives are attached being bent forward give to the knives a much heavier stroke when coming down, as they reach the ground in an almost vertical position far in advance of the shaft or cylinder, thus acting on the principle of an eccentric.

Having thus fully described our invention, what we claim as new, and desire to secure by Letters Patent, is—

The frame consisting of the side beams C C, cross-bar D, axle A, tongue E, and standards I, arranged to receive either the seeding-machine and bars N or the stalk-cutter frame S, as desired, with the levers R R, substantially as and for the purpose set forth.

In testimony that we claim the foregoing as our own we affix our signatures in presence of two witnesses.

JAMES WHAIT.
WM. WHAIT.

Witnesses:
SETH PECK,
SAMUEL PARKER.